United States Patent [19]
Tang

[11] Patent Number: 6,007,031
[45] Date of Patent: Dec. 28, 1999

[54] GOLF BAG STAND AND STROLLER

[76] Inventor: Larry G. Tang, 1053 Golden Eye View, Carlsbad, Calif. 92009

[21] Appl. No.: 09/067,426

[22] Filed: Apr. 28, 1998

Related U.S. Application Data

[63] Continuation-in-part of application No. 08/782,130, Jun. 13, 1997.

[51] Int. Cl.[6] .................................................. A63B 55/00
[52] U.S. Cl. ........................ 248/96; 280/646; 206/315.3; 206/315.7
[58] Field of Search ................................ 248/96, 95, 97, 248/98, 473, 99, 171, 188.4, 169, 170; 280/646, 652, 655; 206/315.3, 315.7

[56] References Cited

U.S. PATENT DOCUMENTS

| | | | |
|---|---|---|---|
| 1,686,774 | 10/1928 | Sperry | 248/96 |
| 3,195,844 | 7/1965 | Roepke | 248/96 |
| 4,289,326 | 9/1981 | Hawkes | 248/171 X |
| 4,474,388 | 10/1984 | Wagner | 280/646 |
| 4,714,268 | 12/1987 | Mather et al. | 248/96 X |
| 4,946,186 | 8/1990 | Cheng | 280/646 |
| 5,062,606 | 11/1991 | Hoshino | 248/171 |
| 5,180,184 | 1/1993 | Chiu | 248/96 X |
| 5,409,253 | 4/1995 | Cheng | 280/646 |
| 5,496,054 | 3/1996 | Wu | 280/DIG. 6 X |
| 5,526,894 | 6/1996 | Wang | 180/65.1 |
| 5,667,239 | 9/1997 | Yang | 280/646 |
| 5,678,842 | 10/1997 | Hook et al. | 280/646 |
| 5,788,261 | 8/1998 | Wu | 280/646 |
| 5,829,585 | 11/1998 | Kao | 206/315.3 |

*Primary Examiner*—Ramon O. Ramirez
*Assistant Examiner*—Tan Le
*Attorney, Agent, or Firm*—William H. Maxwell

[57] ABSTRACT

A collapsible golf bag attachment providing a stand and wheeled dolly for accessible carrying of golf clubs and transport by the golfer, comprised of saddles and a frame fastened to the golf bag and a pair of wheeled legs contollably locked in a deployed mode by a manipulator with a retractile ground engageable post to assist deployment.

13 Claims, 4 Drawing Sheets

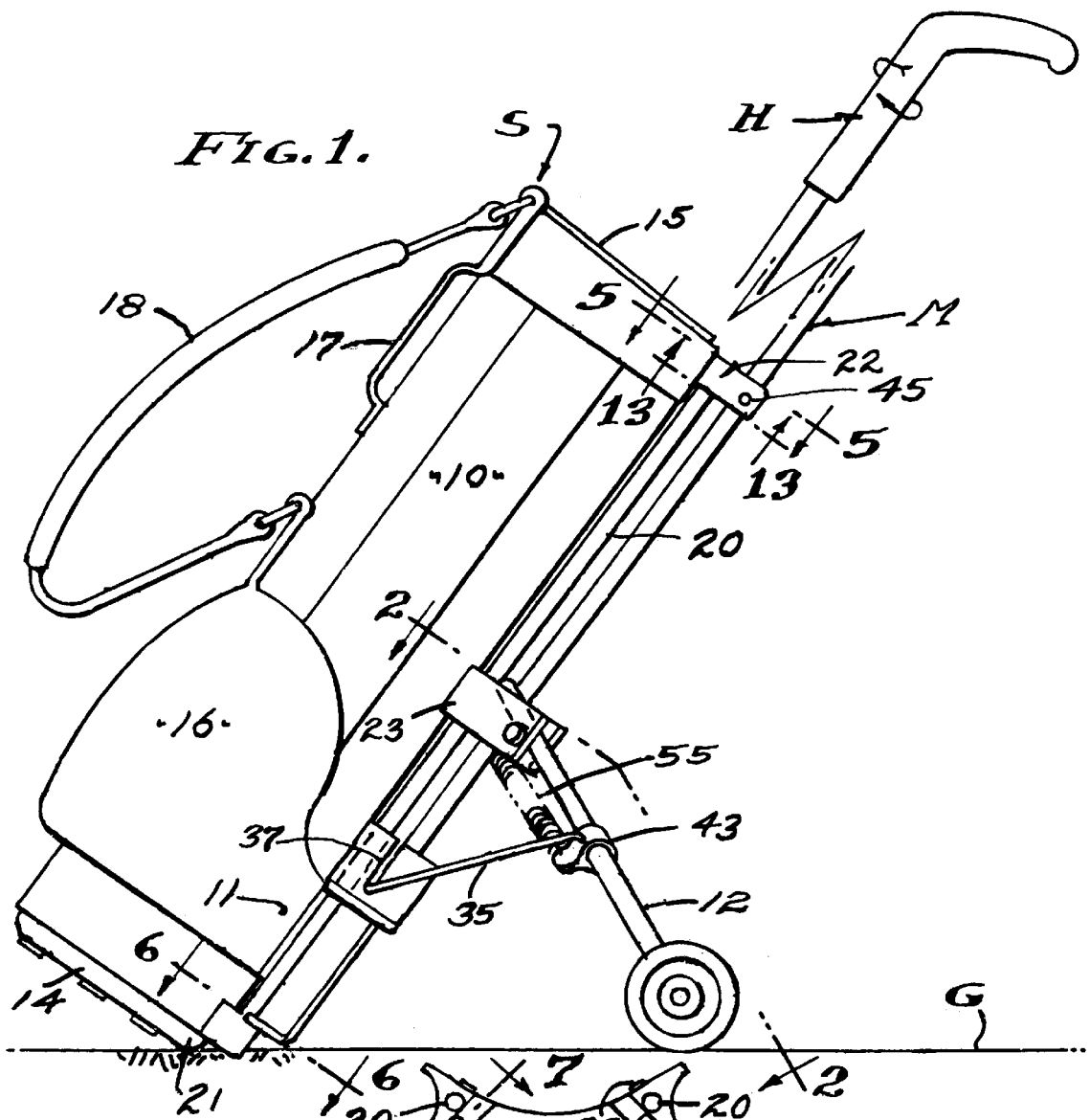
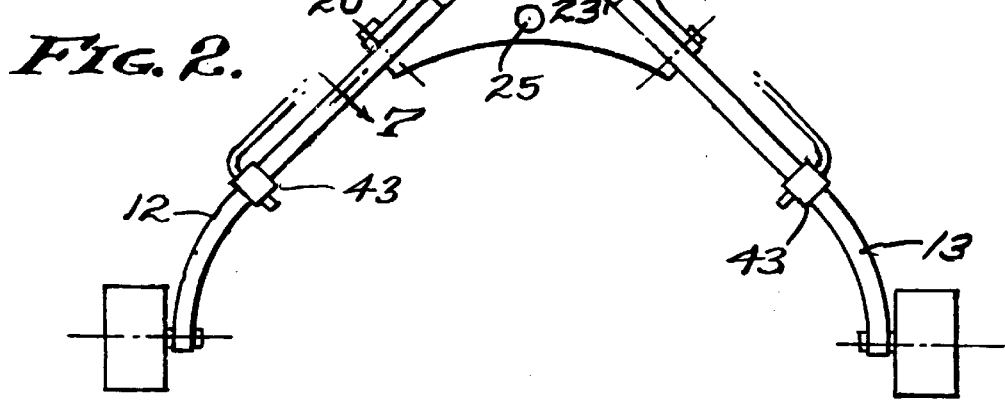

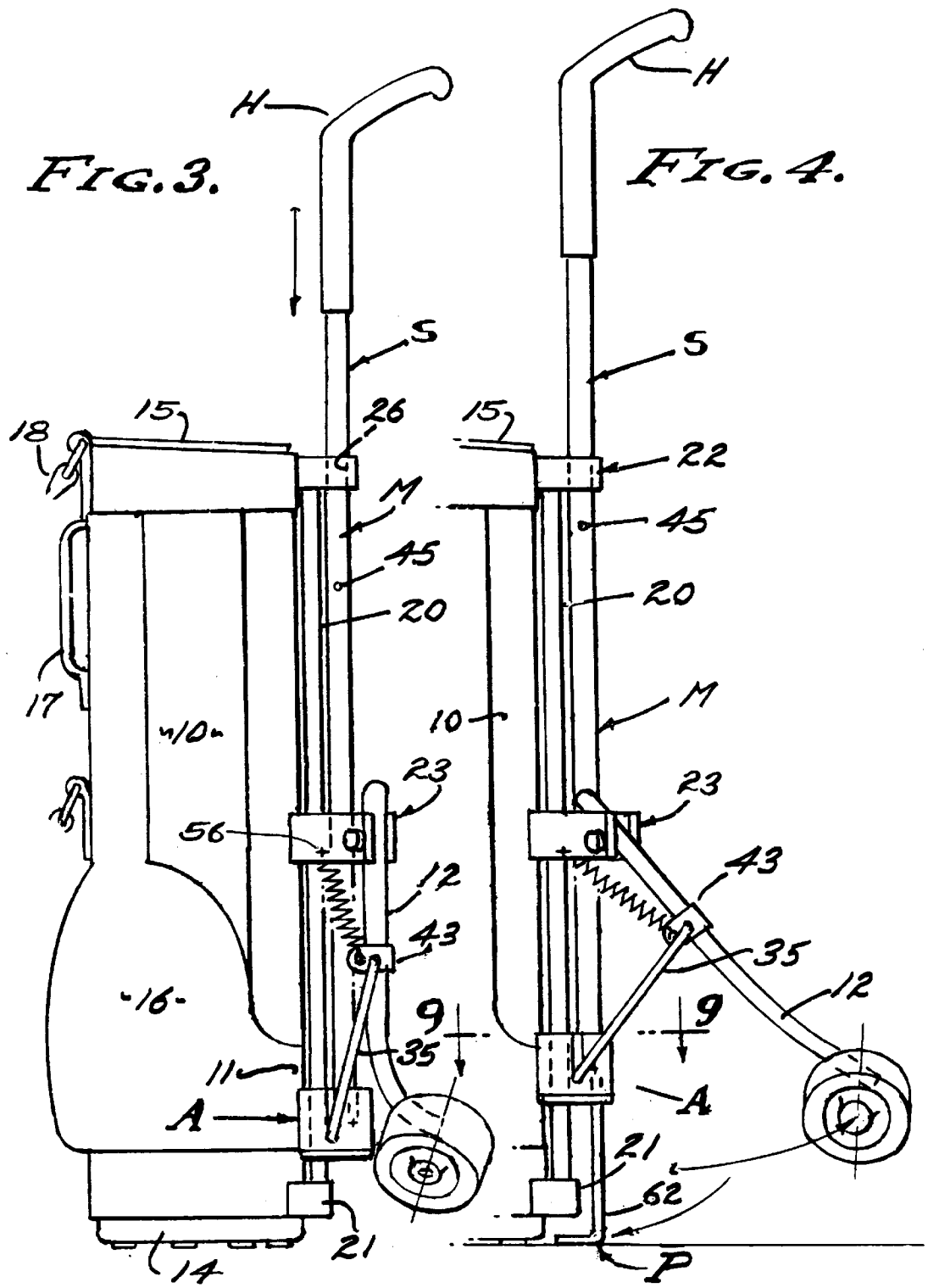

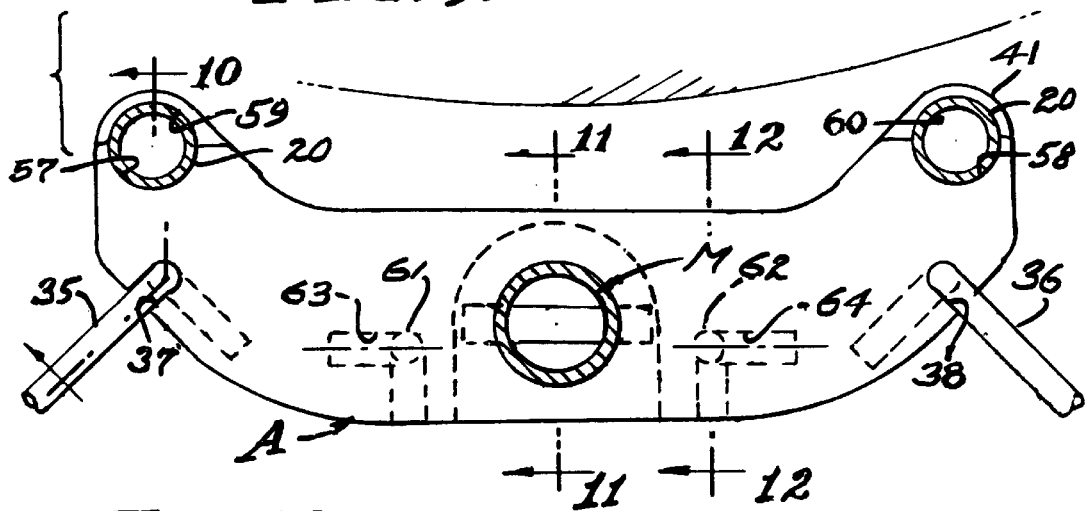
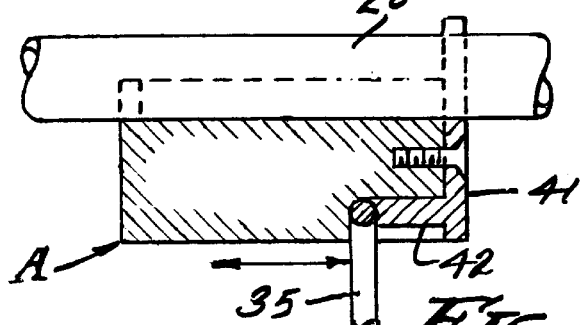
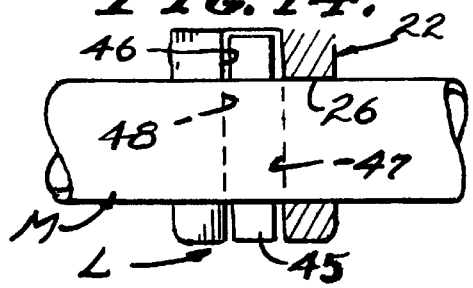
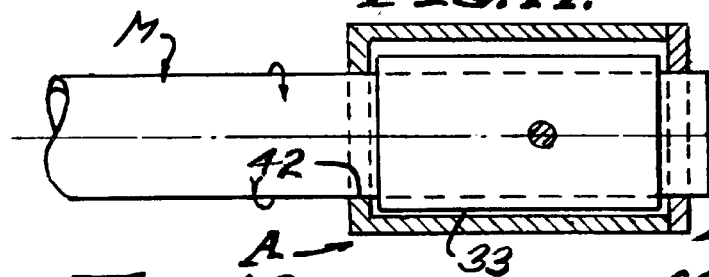
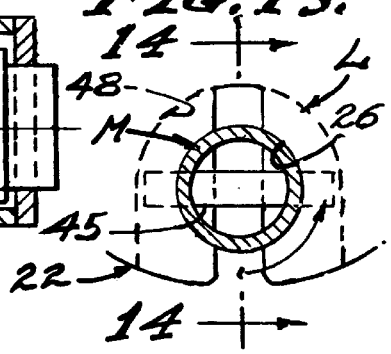
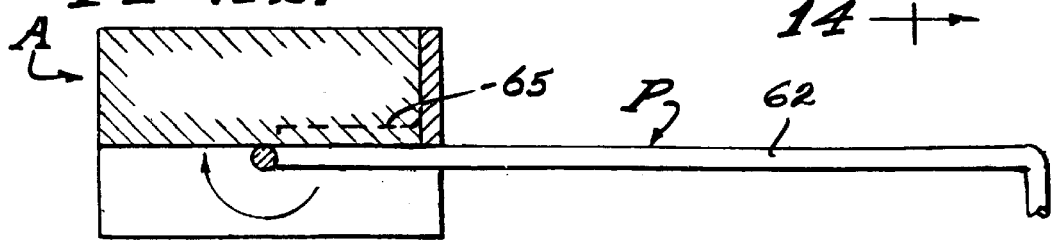

GOLF BAG STAND AND STROLLER

This application is a Continuation In Part of application Ser. No. 08/782,130 filed Jan. 13, 1997.

BACKGROUND OF THE INVENTION

This invention relates to the game of golf which is characterized by a compliment of golf clubs necessary to conduct the games and which must be carried throughout the game. Included in golfing is an assortment of paraphernalia including golf balls and tees etc., and all to the end that a golf bag of clubs and sundry items weighs considerably and draws upon the physical stamina of a golfer. Consequently, there are golf carts and caddies that reduce the strain on the golfer. However, there are situations where the golfer prefers to be self sufficient, and/or to provide assistance to the caddy a wheeled cart or stroller is to be desired in order to conveniently carry the golf bag. Heretofore, wheeled golf bag apparatus has been characteristically complicated, heavy and cumbersome, leaving much to be desired. And accordingly therefore, it is a general object of this invention to provide a simple, light weight and convenient stand and stroller for golf bags, and which is economical and inherently reliable and durable.

A primary object of this invention is to provide a carriage that is easily adapted either temporarily or permanently to a golf bag of usual size and configuration, golf bag and club access being standardized and the carriage of this apparatus being coextensive with said bags. In practice, a tubular frame is employed with injection molded plastic members secured to the top and bottom ends of the bag. Also, an injection molded plastic support member is fixed to the tubular frame to mount wheeled legs that are retractile.

It is an object of this invention to deploy and collapse a wheeled support of the apparatus, extensible for maximum stability and retractile for the convenience of shoulder strap carrying and for storage. In practice, a simple leg and strut support is provided, there being mirror opposite right and left leg wheeled support, the legs and struts of which are divergent at an included angle of approximately 90° and deploying wide tread wheels with a track spread of about 24 inches. A single manually shiftable and weight assisted actuator positions the struts so as to extend and retract the wheeled legs.

It is an object of this invention to controllably manipulate the deployment and collapse of the wheeled support, and to this end there is a manipulator tube that is reciprocatable relative to the tubular frame, and is also rotatable to lock the wheeled support in its deployed mode, and to un-lock and release the same. In practice, the manipulator tube is rotatably secured to the shiftable actuator that shifts the support struts, and is slidably guided through the aforesaid top saddle and the support affixed to the tubular frame. A feature of this invention is that the manipulator tube is both manually and ground operable, and by gravity, to assist deployment of the wheeled support.

An object of this invention is to provide means by which the weight of the golf bag and its contents enables gravity to be used in deploying the wheeled legs into the stand and strolling modes. The wheeled legs are initially spring biased and automatically extended to the deployed positions, partially at least as shown in FIG. 4.

It is an object of this invention to assist collapse of the apparatus, whereby the wheeled support is completely retracted and yieldingly held under spring pressure in that mode. To this end, tension means is provided to yieldingly urge the support legs inwardly as they swing downwardly into a collapsed position closely adjacent to the tubular frame (see FIG. 3).

It is also an object of this invention to inherently hold the apparatus in its deployed condition, by limiting the position of the wheeled legs and by anchoring them in the deployed positions fowardly from a vertical line of support from the tubular frame (see FIG. 1). That is, the manipulator tube can be lowered from the position shown in FIG. 1 so as to position the legs vertically, but no further without collapse. In practice, a pistol grip is provided to push-pull and rotate the manipulator tube, all as circumstances require.

It is another object of this invention to releasably lock the apparatus in its deployed condition, simply by rotating the manipulator tube to engage a key-slot in the uppermost saddle member. Accordingly, the manipulator tube and actuator member shifted thereby can be locked whereby indiscriminate handling of the apparatus is made possible, without inadvertent collapse thereof.

And, it is an object of this invention to reduce the parts and members of this apparatus to a bare minimum, thereby reducing the the cost of manufacture and providing an extremely simple and practical product that is reliable and not subject to malfunction.

SUMMARY OF THE INVENTION

A stand and stroller attachment is provided for conventional golf bags, characterized by its tripod configuration when in its stand condition, and by its dolly configuration when in its stroller condition. This attachment has a tubular frame that carries the overlying bag and an underlying manipulator in the form of an elongated tube shiftable in spaced guides fixed to the frame. Divergentwheeled legs are pivoted on a support member positioned intermediate the ends of the frame, the base end of the golf bag being ground engageable together with the wheeled legs in the stand mode. The shiftable actuator carries a ground engageable post pivoted so as to be extended in the deployment mode to enable weight of the bag and clubs to assist in extending said legs (see Fig.4). The said post is retractile (see FIG. 3).

A feature of this invention is that the plane of motion of the leg and strut at each side of the carriage are coplanar, said planes being divergent from side to side at an included angle of 90° (see FIG. 2). The post is ground engageable as shown in FIG. 4 so as to facilitate deployment of the wheeled legs 12 and 13. Securement of the wheeled Legs in the deployed condition is by key-slot engagement at the top saddle member as shwon in Fig.1 and detailed in FIGS. 13 and 14. in practice, the manipulator tube is controlled by a pistol-grip located less than a person's chest height when extended, and which is as low as hip height when strolling as a wheeled dolly (not shown in the stroll position).

The foregoing and various other objects and features of this invention will be apparent and fully understood from the following detailed description of the typical preferred forms and applications thereof, throughout which description reference is made to the accompanying drawings.

THE DRAWINGS

FIG. 1 is a side view of the Golf Bag Stand And Stroller deployed in its stand ready to stroll condition.

FIG. 2 is a sectional view in the plane of the deployed leg of the tripod triangle and taken as indicated by line 2—2 on FIG. 1.

FIG. 3 is a view similar to FIG. 1 showing the collapsed carrying and storage condition of the device with the wheeled legs thereof retracted.

FIG. 4 is a view similar to FIG. 3, showing ground engagement of the extended post that initiates deployment of the wheeled support.

Figure 5:
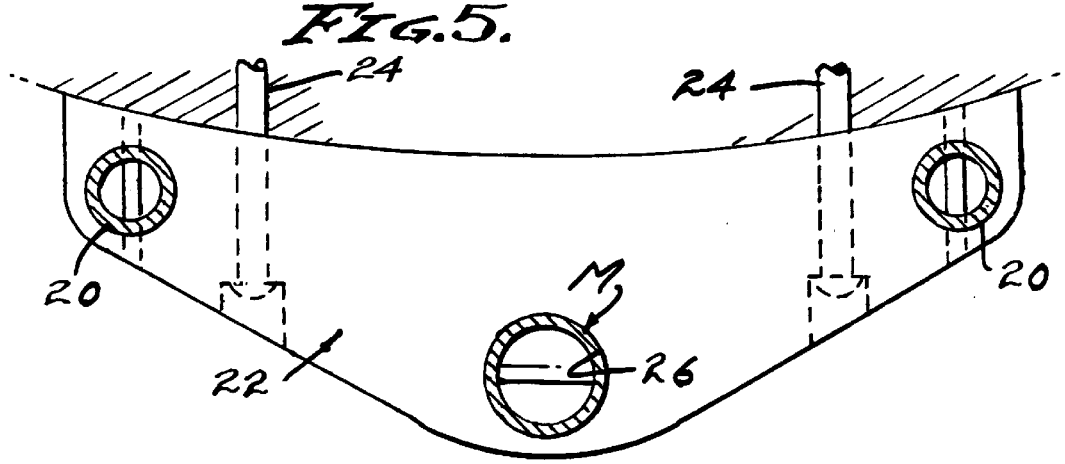
Figure 6:
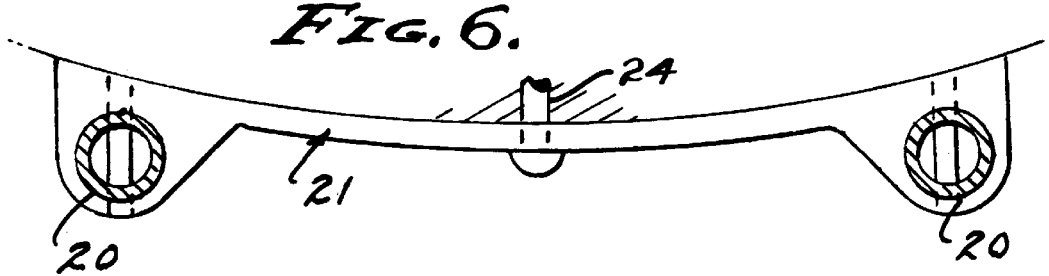

FIGS. 5 and 6 are enlarged detailed views of the top and bottom saddle members, taken as indicated by lines 5—5 and 6—6 on FIG. 1, illustrating attachment of the apparatus to the golf bag.

Figure 7:
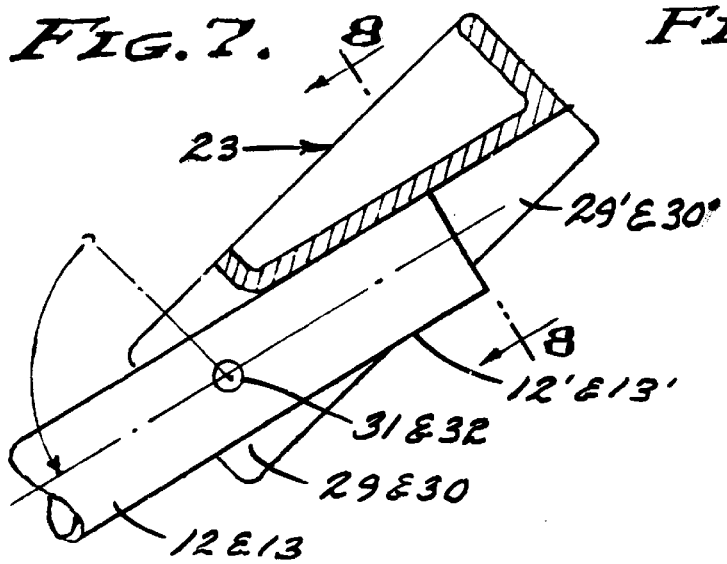
Figure 8:
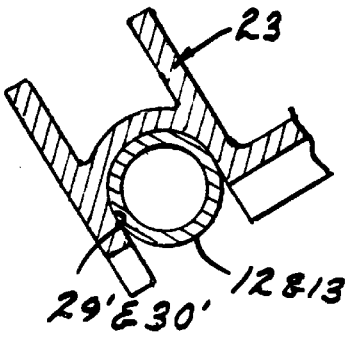

FIG. 7 is an enlarged detailed view of the socket leg mounting to the support therefor, and FIG. 8 is a sectional view of the socket taken as indicated by line 8—8 on FIG. 7.

FIG. 9 is an enlarged detailed view of the leg strut actuator member carried by the frame and shifted by the manipulator tube, and taken as indicated by line 9—9 on FIG. 4.

FIG. 10 is an enlarged detailed view of the leg strut pivot the actuator member, taken as indicated by line 10—10 on FIG. 9.

FIG. 11 is an enlarged detailed view of the rotatable manipulator tube connection to the actuator member, taken as indicated by line 11—11 on FIG. 9.

FIG. 12. is an enlarged detailed view of the retracted ground engageable post pivoted to the actuator member taken as indicated by line 12—12 on FIG. 9

FIG. 13 is an enlarged detailed sectional view of the key-slot and lock pin, taken as indicated by line 13—13 on FIG. 1, and FIG. 14 is a sectional view taken as indicated by line 14—14 on FIG. 13.

PREFERRED EMBODIMENT

Referring now to the drawings, a golf bag 10 is attached to the Stand And Stroller S and shown it its deployed condition as a stand ever ready to be used as a stroller. In its stand condition this golf bag attachment is a tripod characterized by three equilateral triangular sides established by three legs, a golf bag leg 11, and two wheeled legs 12 and 13. Accordingly, the golf bag leg 11 and golf bag 10 are disposed at an included angle of approximately 60°, it being understood that this angular disposition can be altered, for example by employing sides of isosceles triangular configuration having two equal sides. Or for example, by lengthening or shortening the golf bag leg 11.

A typical golf bag 10 is shown, having a closed base end 14, an open top end 15 to receive golf clubs (not shown), and an accessory compartment 16. A handle 17 is provided near the top end to manually lift the bag, and a shoulder strap 18 is swiveled to the upper portion of the bag for bodily carrying it. FIG. 2 shows the planar configuration generally of equilateral triangular side configuration comprised of the wheeled side defined by the two equal legs 12 and 13, the ground level G constituting the third side, and the included angle between the legs being approximately 60° (included angle from an apex to the centers of the two wheel bearings). The planar configuration of the other two tripod sides are also approximately 60° (included angle between the golf bag leg 11 and the opposite wheeled legs 12 and 13 respectively). The base end 14 of the golf bag 10 has corner ground engagement for support when the attachment is in its stand condition as shown in FIG. 1.

Attachment of the golf bag 10 is by means of a frame comprised of spaced parallel longitudinally disposed tubular members 20 coextensive with the underside of the bag 10, and fastened to the base and top ends 14 and 15 of the bag (see FIGS. 1, 3 and 4). As shown, there are lower and upper saddle members 21 and 22 pinned to the tubular frame members 20 secured directly to the bag as by screw fasteners 24 as shown in FIGS. 5 and 6. The golf bag 10 can also be secured as by separate adapters using straps with buckles of Velcro(tm) (not shown). The base end 14 projects from the end of the lower saddle member 21 so as to have simultaneous ground engagement therewith when positioned as shown in FIG. 1. In practice, the tubular members 20 are aluminum extrusions of round cross section and form a ways comprised of spaced members 20 along with the support member 23 slides as next described.

In accordance with this invention, a dual purpose support is provided in the form of a tripod comprised of the central golf bag leg 11 and the laterally extending wheeled legs 12 and 13. A fixed manipulator guide and pivot support member 23 for the legs 12 and 13 is secured to the tubular frame members 20 intermediate the bottom and top saddle members 21 and 22, and in practice midway therebetween as shown in FIG. 1 and fixedly positioned as by fasteners 23' as shown, so as to achieve the optimum equi-lateral triangular tripod that characterizes the embodiment shown. The saddle member 22 also guides the manipulator as will be described.

As is clearly shown throughout the drawings, the support member 23 and saddle member 22 have guide openings 25 and 26 respectively to slidably and rotatably pass the manipulator N of round cross section. In practice, the manipulator M is a straight aluminum tube that is slidable and rotatable in and through the support member 23 and guide member 22, to an UP extended position where it is held and stopped by leg supporting sockets.

Referring now to FIG. 7, support member 23 pivotally supports each leg 12 and 13 at 45° relative to the central vertical plane of the device, separated at an included angle of 90°. In accordance with this invention, there are divergent devises 29 and 30 with pivot pins 31 and 32 from which first class lever portions 12' and 13' of the legs extend. A feature is the continuing channel con-figuration that opens from each clevis and forming sockets 29' and 30' to embrace the extended lever portions 12' and 13' of said legs. The sockets 29' and 30' are channel-shaped with concaved bottoms that interface with the convex surfaces of the elongated leg extensions. Accordingly, the side walls of said channel-shaped sockets rigidly embrace the leg extensions so as to relieve lateral pressures from the pivot pins 31 and 32. Leg attachment to the support member 23 is reinforced and not reliant soley upon the pivot pins which are relatively small and short (see FIGS. 7 and 8). The fully deployed legs 12 and 13 are positively held to their extended positions by bottom engagement in the channel-shaped sockets 29' and 30', and thus positioned they are rigidly held laterally by the opposed side walls of said sockets. Thus, the deployed legs become immovable.

The manipulator M is shiftable on its axis closely adjacent to the underside of the golf bag 10 and positions an actuator A that is moved thereby between the lower saddle member 21 and the intermediate leg support member 23 (compare FIGS. 1 and 3). Stability is attained by employing the spaced parallel round rods 20 as a ways to shiftably support the actuator A, and to this end the actuator has spaced parallel concaved guide channels 57 and 58 open to and slidable on the convex surfaces of the round rod members 20. The actuator A is captured against the ways by the retaining plate 41 that has guide rings 59 and 60 through which the tube members 20 pass (see FIG. 5). As shown in FIG. 11, a thrust collar 33 retains the actuator A on the lower end portion of the manipulator tube M.

Referring now to FIG. 9, the actuator A pivotally supports and positions struts 35 and 36 at 45° relative to the central vertical plane of the device (see FIG. 1), separated at an included angle of 90° in planes common to and next adjacent to the aforementioned planes of legs 12 and 13 (see FIG. 9). As shown in FIGS. 1, 3 and 4, there are clevis channels 37 and 38 to receive the struts with end portions of the struts pivoted in bearing openings in the actuator and rotatably secured therein by a retainer plate 41 with bearing positioning plugs 42. The struts 35 and 36 swing together with the legs 12 and 13 between the positions shown in FIGS. 1 and 3, to extend and to retract said legs, and being connected to said legs by pivot-anchor members 43 as shown. The manipulator M revolves in a bore 44 through the actuator A.

In accordance with this invention, the Stand And Stroller S is controllably operated through the manipulator M that is free to reciprocate through and to rotate in the guide openings 25 and 26. And, the manipulator M also rotates in the actuator A and positions the same so as to convert the apparatus from its passive storage or carrying condition to its stand or stroller condition. Also, the manipulator M is releasably secured in the stroller condition by lock means L as shown in FIGS. 13 and 14. The completely released condition is shown in FIG. 3, and partial initial deployment of the legs 12 and 13 is shown in FIG. 4. Manipulation of the manipulator M is by means of a handle H, preferably in the form of a pistol-grip that is rotatable at least 90° clockwise from a horizontal position to a downward locked position as shown in FIG. 1. Accordingly, the lock means L is provided, preferably in the form of a key-slot or lock to receive a lock pin or bolt 45 carried transversely through the manipulator tube (see FIG. 13) and which enters a key-hole through the front wall 46 of the saddle member 22 to stop against a back wall 47 thereof, as clearly shown in FIGS. 13 and 14. The walls 46 and 47 are separated by a transverse pocket 48 in the saddle member 22 and within which the bolt 45 is free to revolve, entry and exit of the bolt being through said key-hole as shown through the front wall only of the saddle. Thus, the bolt 45 reciprocates through the key-hole and into the pocket 48 where it is restricted to revolve against both the front and back walls of the saddle so as to releasably capture the manipulator M in the stand-stroller condition. Entry and exit of the lock bolt 45 is by manually positioning the operating handle 45.

In order to ensure collapse of the legs 12 and 13 there is a tensioning spring 55 connected between each leg 12 and 13 and an anchor on the support member 23. The springs 55 are tensioned to the legs 12 and 13 from the aforesaid pivot-anchors 43 secured to the legs by the turned-in ends of said legs (see FIG. 2).

A feature of this invention is the assist function of the manipulator M that is ground engageable by means of an extensible post P as shown in FIG. 4, for the purpose of forcefully shifting the actuator A upwardly through the struts 35 and 36 to initiate extension of the legs 12 and 13. Accordingly, the gravitational and manually applied ground engagement of the post P shifts the manipulator M so as to assist the deployment of the legs 12 and 13, utilizing the weight of the bag of clubs. Like the struts 35 and 36, the post P is made of heavy wire or light rod formed into spaced parallel arms 61 and 62 extending from a transverse ground engageable foot and with coaxial He outwardly turned inner ends pivoted in bearings 63 and 64 in the actuator A and rotatably secured therein by the retainer plate 41 with bearing positioning plugs 65 (see FIGS. 11 and 12).

As shown in FIGS. 1 and 4 the retractile and extensible post P is for enabling the stand-stroller condition or mode, and in FIG. 3 is retracted for enabling the collapsed passive condition or mode for carrying and storage. In the event that the golf bag 10 is to stand alone and upright upon its base end 14 (positioned as shown in FIG. 3), the ground engaging post is retracted.

Having described only the preferred forms and applications of my invention, I do not wish to be limited or restricted to the specific details herein set forth, but wish to reserve to myself any modifications or variations that may appear to those skilled in the art as set forth within the limits of the following claims.

I claim:

1. A stand and wheeled stroller attachment for golf bags and adapted to be alternately manipulated between a collapsed mode and a stand and stroller mode, and including;

a frame for support of the golf bag and having an upper saddle member for attachment at an open top end of the golf bag, the golf bag having a ground positioned bottom end, a support member secured to the frame intermediate a bottom end and the top of the golf bag, there being aligned guide openings through the saddle member and the support member respectively, a manipulator reciprocally carried in said guide openings through the saddle member and the support member to extend downwardly from the support member and shiftable upwardly from the upper saddle member by manipulation, an actuator member carried and positioned by the manipulator as it projects downwardly from the support member, a pair of divergent wheeled legs pivoted to the support member to swing downwardly into ground engageable deployed positions respectively and each with an extended top end portion rotatable within a clevis into and out of rigid embracement by a channel-shaped socket portion of the support member continuing from the clevis, and a pair of struts pivoted to the actuator member and each extended to a respective leg to simultaneously operate said legs between retracted and extended positions, a first collapsed mode position and a second deployed mode position forming the stand and wheeled stroller.

2. The stand and wheeled stroller attachment for golf bags as set forth in claim 1, wherein the extended end portion of each wheeled leg is of elongated round cross section, the channel-shaped socket having a concaved bottom interfacing the exterior of said round cross section of said leg when deployed.

3. The stand and wheeled stroller atachment for golf bags as set forth in claim 1, wherein each clevis portion has opposed side walls continuing into side walls of the socket and said side walls being engageable with the top end portion of the wheeled leg.

4. The stand and wheeled stroller attachment for golf bags as set forth in claim 1, wherein the extended end portion of each wheeled leg is of elongated round cross section pivoted in a clevis portion of the support member, the clevis portion having opposed side walls continuing into side walls of the socket and said side walls being engageable with the elongated round cross section end portion of the wheeled leg, and the channel-shaped socket having a concaved bottom interfacing the exterior of the round cross section of said end portion of the wheeled leg when said leg is deployed.

5. The stand and wheeled attachment for golf bags as set forth in claim 1, wherein an extensible post projects from the manipulator and below the bottom end of the golf bag, and having a ground engageable foot for its upward movement to assist deployment of the stand and stroller attachment from its collapsed mode to its standstroller mode.

6. The stand and wheeled attachment for golf bags as set forth in claim 5 wherein the ground engageable foot of the post is retractile to enable ground engagement of the bottom end of the golf bag when the stand and wheeled stroller attachment is collapsed.

7. The stand and wheeled attachment for golf bags as set forth in claim 1, wherein a spring extends between each of said divergent wheeled legs and said support member therefor to bias said legs to the frame member when the manipulator is in said first collapsed mode position.

8. The stand and stroller attachment for golf bags as set forth in claim 1, wherein the manipulator is rotatably carried in said guide openings through the support member and upper saddle member, there being means for locking the manipulator in said second deployed position and comprising a key-slot opening with a pocket in the upper saddle member, and a bolt carried by the manipulator and engageable through said key-slot and rotatably disengageable from within said pocket.

9. The stand and stroller attachment fot golf bags as set forth in claims 8, wherein the pocket in the upper saddle member has opposed walls engageable with the bolt to position the manipulator.

10. A stand and wheeled stroller attachment for golf bags and adapted to be alternately manipulated between a collapsed mode and a stand and stroller mode, and including;

a support for the golf bag and having upper and lower saddle members for spaced attachment at a bottom ground positioned end and an open top end of the golf bag, there being a frame extending therebetween, a support member secured to said frame intermediate said bottom and top ends of the golf bag, there being aligned guide openings through the saddle member and the support member respecively, a manipulator reciprocally carried in said guide openings through the saddle member and the support member to extend downwardly from the support member and shiftable upwardly from the upper saddle member by manipulation, an actuator member shiftably carried on said frame and positioned by the manipulator as it projects downwardly from the support member, a pair of divergent wheeled legs pivoted to the support member to swing downwardly into ground engageable deployed positions respectively and each with an extended top end portion rotatable within a clevis into and out of rigid embracement by a channel-shaped socket portion of the support member continuing from the clevis, and a pair of struts pivoted to the actuator member and each extended to a respective leg to simultaneously operate said legs between retracted and extended positions, a first collapsed mode position and a second deployed mode position forming the stand and wheeled stroller.

11. The stand and wheeled stroller attachment for golf bags as set forth in claim 10, wherein said frame is a ways members upon which the support member is affixed and along which the actuator member is carried.

12. The stand and wheeled stroller attachment for golf bags as set forth in claim 10, wherein said frame is comprised of spaced parallel ways members upon which the support member is affixed and upon which the actuator member is slidably carried.

13. The stand and wheeled stroller attachment as set forth in claim 10, wherein said frame is comprised of spaced and parallel round cross sectioned rods upon which the support member is affixed, the actuator member having spaced and parallel guide channels slidably engaged upon the round cross sectioned rods.

* * * * *